US008712925B2

United States Patent
Clark et al.

(10) Patent No.: US 8,712,925 B2
(45) Date of Patent: Apr. 29, 2014

(54) METHOD AND SYSTEM FOR BILLING BASED ON COLOR COMPONENT HISTOGRAMS

(75) Inventors: Raymond J. Clark, Webster, NY (US); Stuart A. Schweid, Pittsford, NY (US); Roger Lee Triplett, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 190 days.

(21) Appl. No.: 13/275,934

(22) Filed: Oct. 18, 2011

(65) Prior Publication Data

US 2013/0097099 A1    Apr. 18, 2013

(51) Int. Cl.
G06F 17/00 (2006.01)
G06G 7/00 (2006.01)
G06Q 30/04 (2012.01)
G06Q 30/02 (2012.01)

(52) U.S. Cl.
CPC ............ G06Q 30/04 (2013.01); G06Q 30/0283 (2013.01)
USPC ......................................................... 705/400

(58) Field of Classification Search
CPC ........................... G06Q 30/04; G06Q 30/0283
USPC ................................................ 705/7.35, 400
See application file for complete search history.

(56) References Cited

U.S. PATENT DOCUMENTS

| | | | |
|---|---|---|---|
| 6,516,157 B1 * | 2/2003 | Maruta et al. ...................... 399/8 |
| 7,903,285 B2 | 3/2011 | Malik et al. |
| 2002/0159106 A1 * | 10/2002 | Fuchigami et al. ........... 358/518 |
| 2009/0099980 A1 | 4/2009 | Ni et al. |
| 2009/0195800 A1 | 8/2009 | Malik et al. |
| 2010/0088201 A1 | 4/2010 | Nagarajan et al. |
| 2010/0100505 A1 | 4/2010 | Campbell et al. |
| 2010/0280929 A1 | 11/2010 | Coffey et al. |

* cited by examiner

*Primary Examiner* — Allen J Jung
(74) *Attorney, Agent, or Firm* — Pillsbury Winthrop Shaw Pittman, LLP

(57) ABSTRACT

Disclosed is a processor-implemented method for processing images. The processor receives image data of a color space defined by input provided to a system by a user, determines at least one color attribute of the pixels in the received image correlating to at least perceptual image characteristics, determines statistics using the attribute(s), and analyzes the statistics to classify the image into a category. Based on at least the category, a billing structure for the image is determined. For example, chroma and/or hue of pixels can be used to create histograms, whose data is used to determine a degree of color and/or content of an image, which is categorized. Color space components of received pixels can also be statistically analyzed. Such determinations consider billing based on human perception of use of color. Billing for color images in this manner satisfies the user and increases use of color output (e.g., printing).

18 Claims, 8 Drawing Sheets

METHOD AND SYSTEM FOR BILLING BASED ON COLOR COMPONENT HISTOGRAMS

FIELD

This application generally relates to digital image processing, and in particular, to a system and method for discerning and billing for different levels of use of color in an image.

BACKGROUND

Image data comprises a number of pixels having a number of components that contribute to defining the image, such as color, chroma, hue, brightness, and/or intensity. Each pixel of the image is assigned a number or a set of numbers representing the magnitude of color at that particular spot. Binary image data has two possible values for each pixel, black (or a specific color) (represented by the number "1") or white (represented by the number "0"). Images that have a large range of shades are referred to as grayscale images. For example, grayscale images have an 8-bit value per pixel comprising 256 tones or shades of gray for each pixel in the image (gray level of 0 to 255). Grayscale image data may also be referred to as continuous tone or contone image data. For color images, grayscale refers to shades of color. The pixels in a color image may be defined in terms of a color space, typically with three values, such as RGB—R for red, G for green, and B for blue—or four values, such as CMYK—C for cyan, M for magenta, Y for yellow, and K for black, although any range of values can be used.

The pixels may also be defined in terms of device independent space (e.g., when inputting image data, such as standard RGB (sRGB) or CIE L*a*b) or a device dependent space (e.g., when outputting image data, such as device RGB or device CMYK). When outputting image data to an output device (e.g., copier, printer, or multi-function device (MFD)), a fraction of the maximum possible marked density may be used to identify how much ink is employed for a print or copy job. Such information may typically be used for billing a user for print or copy jobs. For example, some methods employ a billing strategy based on an estimated amount of ink or toner consumption; others bill users based on a print mode selection (e.g., draft, standard, color, enhanced, etc.) of the output device. In dynamic print-job environments, because printing documents using black ink or toner is less expensive than using colored ink or toner, billing is often based on the amount of color content contained in the job to be printed. In order to bill users for color printing, color detection is an important feature required in an image path. Color detection is used to analyze documents for presence of color as well as an amount of color in order to bill users accordingly. Generally, the higher the presence and amount of color in a document, the higher the cost.

Some systems include counting the number of pixels in the image data of the document to be printed. For example, a number of binary pixels associated with the CMYK color planes may be counted to determine a pixel count for each category of color at the time of marking for output in the image path. Generally, with existing color detection and counting methods, a pixel will be labeled as color when the presence of any one of the C, M, and Y signals is detected. U.S. patent application Ser. No. 12/252,391 (published as Patent Application No. 2010/0100505 A1), filed Oct. 16, 2008 by the same Assignee (Xerox Corporation), which is hereby incorporated by reference in its entirety, proposes a way to count color pixels. In solid ink and ink jet products, however, it is desirable to render neutral gray objects with CMYK ink (e.g., create objects that appear gray to the human eye by using a particular combination of C, M, Y, and K, thus enabling higher image quality. This combination of C, M, Y, and K is referred to as process color, rich black, or composite black. For billing purposes, users do not desire to be charged for color pixels that were (are) supposed to be gray (neutral with respect to color; a shade of black (not as in grayscale)). The above-referenced '505 publication, for example, has limitations in handling images that are converted to contone from rendered binary data. Moreover, the '505 publication inhibits counting of gray pixels that are converted to process color by system electronics as being counted as color pixels.

In a typical multi-tier billing system for production printers, images are placed into different tiers based on the amount of color content on each page. Placing the image in the correct tier level is important both from the user's, as well as the company's, perspective. Solid ink jet printer machines render neutral areas of an image with a combination of cyan, magenta, yellow, black (CMYK) toner/ink when printing or copying. This, however, creates problems in billing since these "gray" counts may be composed of color toners that mimic gray but are counted towards color.

This is because most existing billing systems are based on counting the number of color pixels in the C, M, Y planes. Use of process (or "rich") black to render monochrome content makes it difficult to implement a multi-tier billing scheme based on use of color that is both reliable and fair in the user's eyes. For instance, a given pixel may be counted as a color pixel when the presence of any one of the C, M, and Y signals is detected—although it may actually be neutral gray. This increases the possibility of a page with composite black or gray to be classified as color, which is undesirable, because the color content results used to determine a billing strategy for a document (or image) may be skewed. Superior monochrome image quality that is delivered by use of process neutrals could be billed as neutral; however, an unsophisticated user may not differentiate this from very dark colored areas that should be billed as color. A per-ink pixel counting based algorithm measures by quantity and applies an imperfect mapping algorithm in an attempt to infer color content. As a result, at times the user will pay the color price for a neutral page, and at times the user will charged a monochrome price for a color page. This leads either to lost revenue or users that perceive that they have been overcharged.

Accordingly, an improved system and method of categorizing color content according to the quantity and types of color used as well as its perception by the human eye, enabling billing paradigms that are better correlated to the value received by the user is desirable.

SUMMARY

One aspect of the disclosure provides a processor-implemented method for processing image data using an image processing apparatus. The image processing apparatus has at least one processor for processing image data having a plurality of pixels. The method includes the following acts implemented by the at least one processor: receiving image data defined by input provided by a user of the image processing apparatus having a plurality of pixels of a color space; determining at least one color attribute of each of the plurality of pixels in the received image data correlating to at least perceptual image characteristics; determining statistics for the plurality of pixels using the at least one color attribute; analyzing the determined statistics to classify the image data into a category, and determining a billing structure for the image data based on at least the category.

Another aspect of the disclosure provides a system for processing image data having a plurality of pixels. The system has an input device for receiving image data and at least one processing element. The at least one processing element processes the pixels of the image data, and each processing element has an input and an output. The at least one processing element is configured to: receive image data defined by input provided by a user of the image processing apparatus having a plurality of pixels of a color space; determine at least one color attribute of each of the plurality of pixels in the received image data correlating to at least perceptual image characteristics; determine statistics for the plurality of pixels using the at least one color attribute; analyze the determined statistics to classify the image data into a category, and determine a billing structure for the image data based on at least the category.

Yet another aspect of the disclosure provides a non-transitory computer readable medium having stored computer executable instructions, wherein the computer executable instructions, when executed by a computer, direct a computer to perform a method for processing image data, the method includes: receiving image data defined by input provided by a user of the image processing apparatus having a plurality of pixels of a color space; determining at least one color attribute of each of the plurality of pixels in the received image data correlating to at least perceptual image characteristics; determining statistics for the plurality of pixels using the at least one color attribute; analyzing the determined statistics to classify the image data into a category, and determining a billing structure for the image data based on at least the category.

Other features of one or more embodiments of this disclosure will seem apparent from the following detailed description, and accompanying drawings, and the appended claims.

BRIEF DESCRIPTION OF THE DRAWINGS

Embodiments of the present disclosure will now be disclosed, by way of example only, with reference to the accompanying schematic drawings in which corresponding reference symbols indicate corresponding parts, in which.

DETAILED DESCRIPTION

Figure 1:
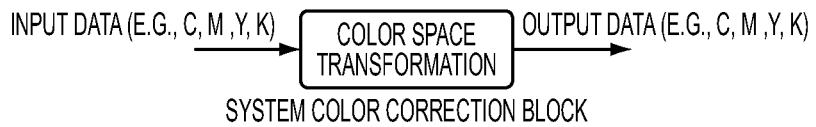
FIG. 1 illustrates a flow diagram showing prior art color space transformation.

According to one or more embodiments, a methodology is disclosed that uses statistics related to one or more color attributes of pixels and determines a billing structure based on those statistics. For example, chroma and/or hue histograms and/or other components of color present in an image may be determined and analyzed to determine type(s) of content in an image for output. The image data can then be categorized. The categories can be based on user's visual perception of an amount of color in an image (or document). Thus the statistics and category can be used to determine the billing structure (as opposed to amounts of marking material used to mark the image on a substrate). This kind of statistical determination—using color attributes of pixels to characterize an image—enables improved billing that is based on color as perceived by the human eye (when the image is copied/printed on a page). It provides an intuitive implementation that recognizes various forms of color that are of interest for any reason, such as due to their value to the user, or impact on marking engine maintenance costs. It can also help in selecting or choosing an appropriate image billing method, as well as increasing the adoption of color usage in the marketplace.

This disclosure uses algorithms, methods, and processing elements (e.g., hardware and/or software) in multi-function systems/devices to determine a billing structure taking the above into consideration.

Throughout this disclosure, neutral and non-neutral (i.e., color) pixels and one or more attributes for non-neutral/color pixels are used as elements for determining billing structures (and/or estimating billing costs). The term "pixel" as used herein is defined as a pictorial element of data that may be provided in any format, color space, or compression state which is associated with or readily convertible into data that can be associated with a small area or spot in an image that is printed or displayed. A pixel can be a tuple of samples, each sample indicating a magnitude of a different color component for a given pixel, which is a geometric area of an image, such as a $\frac{1}{600} \times \frac{1}{600}$ inch square at certain coordinates. A pixel may be associated with an array of other small areas or spots within an image, including a portion of an image, such as a color separation plane. Generally, a pixel is defined in terms of its attributes, e.g., value (or brightness or intensity), and its position in an image, and sometimes color. A pixel can be defined using any number of features or attributes. For example, chroma (or chrominance) of a pixel is the colorfulness relative to another color that appears neutral (or white) under similar viewing conditions. Hue of a pixel is a property perceived as varying with wavelength of light. Value (or lightness or brightness) relates to how much light, regardless of chroma or hue, is being observed. Chroma, hue, and value, for example, are attributes (also referred to herein as "color attributes") of a pixel of image data that correlate to perceptual image characteristics (as perceived by the human eye)

and/or an appearance of a pixel in both device independent and device dependent color spaces. Saturation is also another color attribute of a pixel.

An image generally comprises a plurality of pixels having a number of "components" in a color space (also referred to as "color components" and "color space components" in the art and throughout this disclosure) that contribute to defining the image within a color space. Colors may be described in a mathematical space, each color being at a point within that space specified by a tuple of numbers, each number indicating a magnitude of one of the color space components. For some color spaces, these are primaries, for example Red, Green, Blue, Cyan, Yellow, Magenta, and Black, that are used to define colors of the color space.

As used herein, "device dependent" color space (or image data) means color schemes which are tied to or related to color production by a specific machine, such as printer, scanner or monitor. Many printing or copying machines that produce a reflected product that must be illuminated to be viewed use subtractive techniques to produce color (e.g., CMYK). Devices that are viewed or that display data, such as monitors, use additive color to produce color (e.g., RGB). Typical device dependent color spaces, for example, include red-green-blue (RGB) or cyan-magenta-yellow-black (CMYK) color spaces. The color gamut is produced by a machine using different combination of these colors. Typical device independent color spaces (i.e., color schemes which are not tied to color production of a specific machine) include, for instance, CIE XYZ or CIE L*a*b* color spaces. No device is needed to produce these colors. Rather, the color space is related to human observation of color.

The term "neutral pixel" as used herein is defined as a pixel that is noticeably black (e.g., when output), noticeably white, not having any chroma (i.e., no color), or rendered gray during processing, such when using as black ("K") colorant or a combination of colors and/or black to form composite black (formed from a combination of "CMYK"). A neutral pixel is a pixel that conveys black and white or gray information. With regard to some billing schemes, a neutral pixel is a pixel with one or more of its components (e.g. C, M, Y, K) on and that, when viewed in the context of other (neighboring) pixels, gives the appearance of black or gray. For example, pixels, when output on a document, may be rendered gray using black/composite black ink or toner. Neutral pixels have a chroma value that is about and/or close to 0.

A "color" or "non-neutral" pixel as used herein is defined as a pixel that is typically noticeable or perceptible to the human eye as having color, e.g., when output (copied or printed) on paper. Color pixels have chroma values in excess of zero (0). The term "non-neutral" or "color" pixel as used herein is defined as a pixel that comprises at least one color from a color set (e.g., when output via copy or print) that is perceptible (e.g., to the human eye) and/or recognizable as having color cast. For example, a color pixel may comprise one or more colors such as cyan ("C"), magenta ("M"), and/or yellow ("Y") and be perceived as cyan, magenta, and/or yellow (or other colors) when output. Although neutral pixels can also include a combination of colors, such pixels do not appear (e.g., to the human eye) to have any perceivable color when output, as noted above.

A "category" is defined as a classification for image data that is selected to define image data as determined by its pixel attributes and components. Any number of categories may be used to define image data. Categories may be pre-defined or adaptive. In implementations, the image may be classified into a category such as: monochrome, highlight color, bi-level, contone, discrete color, subdued color, low color, and full color, for example. Image data that is considered "monochrome" is defined as comprising a neutral or one single non-neutral hue/chroma point. A plurality of pixels of image data that represent "highlight color" comprise some pixels that are neutral and some (different) pixels that have one or more single hue/chroma points. Image data of highlight color is equivalent to monochrome image data with neutral added. A "bi-level" color scheme for image data comprises only two levels: no ink and full area coverage (whereas no ink and area coverage less than 100% would be considered to be monochrome image data). "Contone" image data comprises a continuum of shades of brightness (or gray levels). Image data that comprises "discrete color" includes multiple specific points in a hue/chroma 2-D map of colors, although allowing variations in brightness, but not hue or chroma. "Subdued color" image data is defined as image data comprising low chroma that is close to neutral but with a color cast. Image data of "low color" comprise a mostly neutral image, with little use of color. Color content of "low color" images could be many low chroma or a few high chroma, but overall there is not much chroma on the page. "Full Color" image data comprises an unrestrained use of any hue/chroma combination.

The categories that are described herein for classifying the image data, which are used to determine a billing structure, are exemplary and for explanatory purposes only. The categories used to classify the image (and thus, to bill for the output of the image) can be extended and/or altered in any number of ways. In some embodiments, sub-categories may be used and/or selected for classifying image data. For example, it may be determined that an image is categorized as a full color image without much color (e.g., a low percentage of color pixels) or a full color image that uses lots of color (e.g., a high percentage of color pixels). Accordingly, the number and types of categories used to define the image data are not limited.

A "user" is a person, persons, or party that sends information to a system to be converted to output in a form viewable or consumable by a customer. A "customer" is a person, persons, or party that receives output from the system (e.g., send by a user) and views or consumes it (e.g., viewing it or further processing it). The customer may be a human or a machine.

A multifunction device or MFD is a product or piece of equipment having one or more functionalities, including, but not limited to: scanning, printing, copying, and faxing. An MFD can be used in an office, for example. It can be accessed locally or remotely, and connected to a network.

Generally, in known output systems/devices (e.g., printers, copiers, MFDs), when an image is to be printed or copied on a page or document, the image is input into a device and the image data is processed in an image path. The image data can be converted into a device dependent space (from device independent space) appropriate for the selected or specific output system/device prior to being consumed by that device (which can include output to devices other than printing devices, such as a monitor or projector). For example, with reference to method 100 at FIG. 2, image data comprising a plurality of pixels is received at step 102 and can be processed at step 104 using one or more processors. For example, device independent image data can be processed by processor(s). In some instances, if the image data is not already in an independent color space when received, then a step of converting the image data to a device independent color space may be optional. In other instances, dependent image data may be processed.

As previously noted, in some known systems/devices, an image may be processed and a billing structure/strategy for outputting the image employed wherein a pixel count is used for the billing structure. Such counts are typically an essentially pure count of color pixels, e.g., determining an amount of pixels for each output color component, and whether or not composite black ink or toner is added during marking. For example, a binary CMYK domain is common in solid ink and/or other printing devices.

This disclosure, however, proposes an improved electronic way of processing and analyzing image data in a received color space, so that pixels that appear visibly neutral to the human eye on an output image are not counted/billed for in an incorrect category of color when determining a billing structure for an image (e.g., from a user). It also proposes an improved electronic way of processing and analyzing image data to recognize categories of image content that are useful to distinguish due to a value that they provide to the end user and/or due to their impact on system maintenance costs. Using existing and/or added hardware and/or software in the image/copy path, the following disclosure details how color attributes and color space components of pixels of image data are used to derive a billing structure/strategy for the image data (e.g., of a page or a document) being processed. Although there are exemplary embodiments described herein, it is to be understood that such embodiments are not meant to be limiting, and that other methods or algorithms that determine attributes or components of color content (including those perceived by the human eye) for billing purposes are within the scope of this disclosure.

Figure 2:
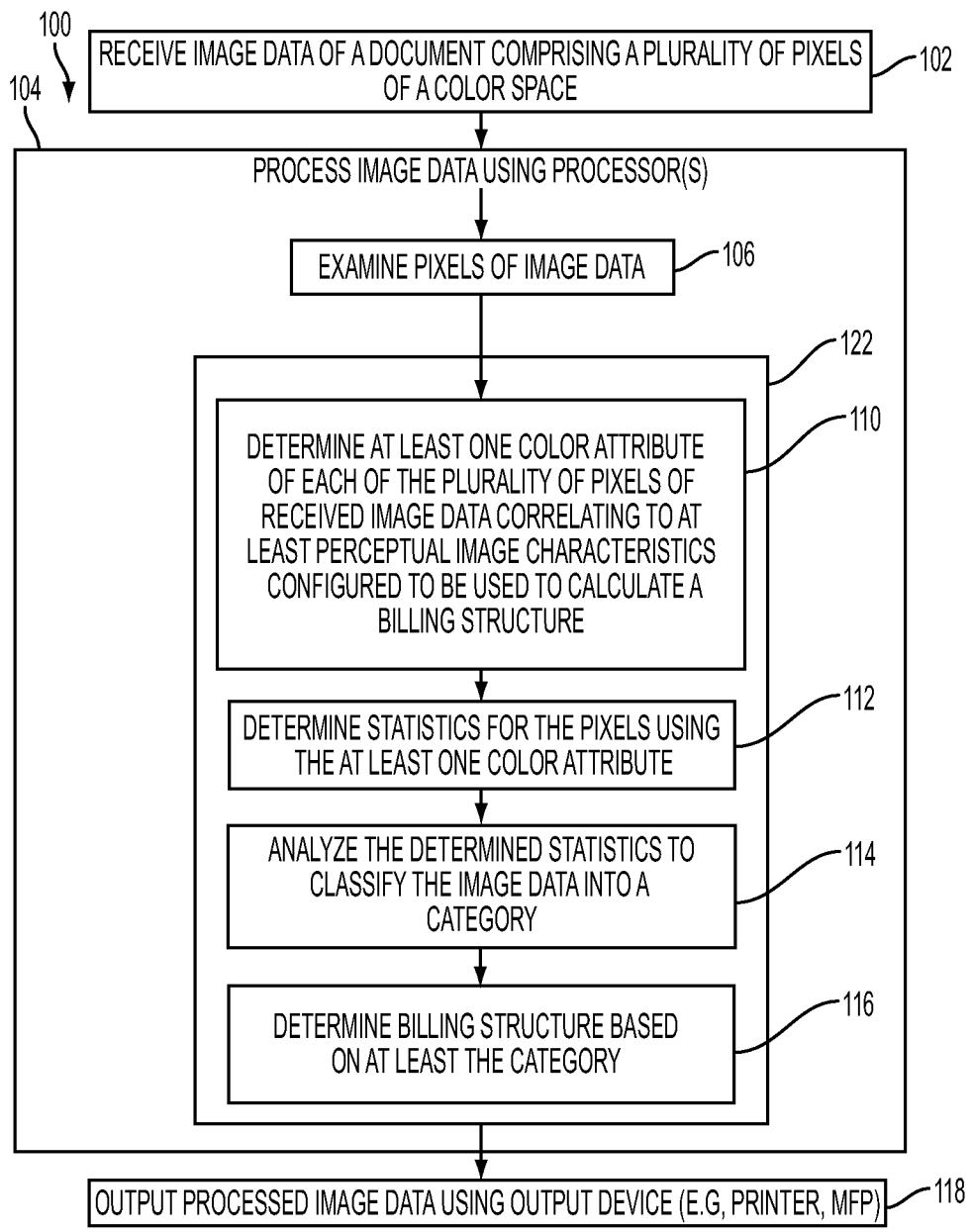
FIG. 2 illustrates a flow chart/block diagram illustrating a method for processing image data and determining a billing structure for an output image using color attribute(s) and statistics in accordance with an embodiment of the present disclosure.

In order to reduce or prevent potential billing problems with regards to billing users for color pixels that do not visually appear to the human eye to contain color, this disclosure provides a method 100 for processing image data and determining a billing structure for outputting images based on at least one color attribute of the pixels of image data, as shown in FIG. 2. The method 100 is not restricted to a particular color space; however, it may be implemented in device independent color space, and can possibly be performed in conjunction with color pixel counting in device dependent space to determine a billing structure for the image. As further noted below, pixel counting in device dependent space can also be used in conjunction with the herein disclosed method to determine a billing structure for an image. Generally, a billing structure is a method by which a charge to a user for printing or copying a document is calculated. A billing structure may be a calculation method associated with or correlated with tiers, thresholds, values, or algorithms, for example. A billing structure may be determined based on such calculations, and/or used in conjunction with a plurality of rules. In general, as used herein, it is a determined way for billing for selected/processed image data (or a particular job). Each billing structure may be selected from a plurality of billing structures. In some embodiments, each billing structure may be determined and adjusted (in some cases, adaptively) and applied to image data for each job and/or a plurality of jobs. Billing structures may be adjusted or selected based on color attributes of image data that is processed using the method and/or system described herein. Billing structures are selected or determined based on a categorization of image data as received and provided by user (e.g., as a user intends the image to be perceived).

Figure 7:
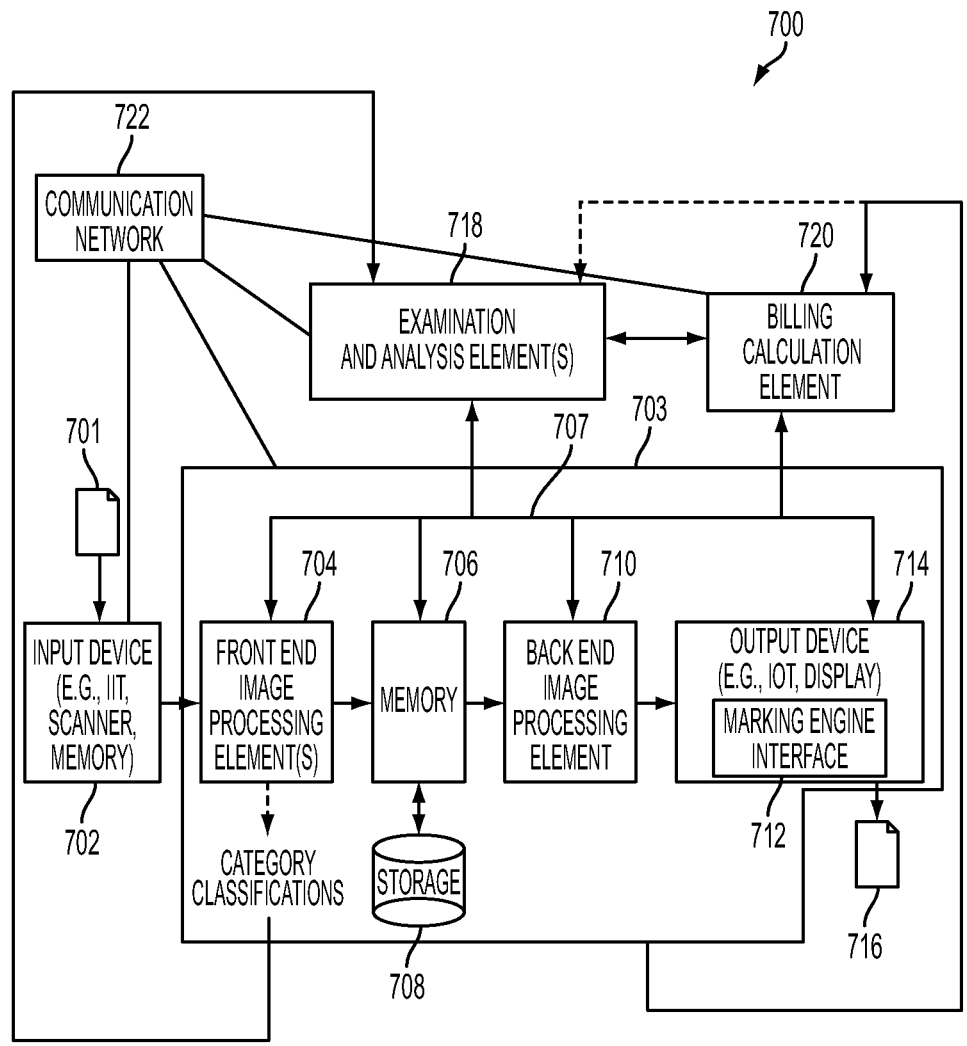
FIG. 7 illustrates an exemplary block diagram of an image path of a system, device, or image processing apparatus, in accordance with an embodiment, comprising at least one processor for processing and billing for images using the method of FIG. 2.
Figure 8:
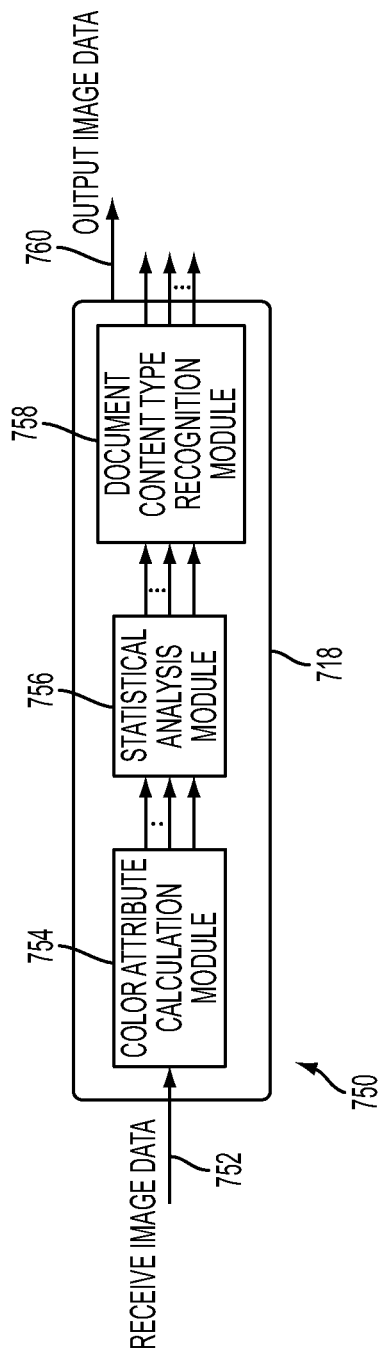
FIG. 8 illustrates exemplary examination and analysis modules that can be used to process the method of FIG. 2 and/or used with the system of FIG. 7 to determine billing structures for images.

Referring back to FIG. 2, illustrated is a flow chart/block diagram illustrating a method 100 for processing image data to determine a billing structure for outputting images in accordance with an embodiment. Each of the method steps that are shown in FIG. 2 and throughout this disclosure may be implemented by one or more computers or processors, for example, and are not meant to be limiting. For example, the elements or modules as shown in FIG. 8 (or FIG. 7) may implement the herein described method.

As previously noted, the method 100 begins at step 102 in which an output device/image processing apparatus/processor receives image data defined by input provided by a user of the image processing apparatus. In a non-limiting embodiment, the received image data may represent a document comprising at least one page. More specifically, the received image data is data that represents the image data that is input by the user (to a processor, apparatus, or system) as-is and as intended for output, without significant processing (as compared to image data that is configured for processing and/or modification and for marking by parts of the apparatus or system). For example, data that is without significant processing may be the input provided by the user may or may not comprise a plurality of pixels of image data, but may be defined (e.g., converted) by an apparatus/processor/system to image data with pixels that is received at 102. The received image data is designed to represent what the user sends and intends the customer to receive (e.g., an image that the user defines and wants the customer to see).

The image data that is input by a user may be uncompressed raster image data, for example, or compressed image data. The image data that is input by a user may be in any format, e.g., in page description language format (PDF, Postscript, PCL, etc.), and expressed in different forms. The received image data is configured to represent (in pixels) the user's intent of the image. The received image data comprises a plurality of pixels of a color space for processing by the processor(s). In some embodiments, the image data is received in device independent space. Alternatively, the image data may be in device dependent space. For example, the image data may be received in contone or RGB color space, or alternatively, comprise black and white pixels. Device dependent color space values that are received, such as RGB and CMYK, may be converted to a device-independent color space, such as CIE L*a*b* color space, using transformation algorithms or a look-up-table (LUT), as known in the art; or, using ICC color management profiles associated with the printing system. The received image data in step 102 is representative of any type of page or document and may include a variety of objects to be detected and used by method 100; however, method 100 may use an image that includes any combination of objects (including text). For example, the image may include objects such as monochrome color text object(s) and/or color text object(s).

After receiving image data of a color space in 102, the image data is processed at 104. Such processing may include transforming the input image data into device independent color space, as noted above, for example, if the image data is not already in device independent color. Techniques for converting image data from a device dependent color space to a device independent color space are well-known in the art and therefore not discussed in detail herein.

The pixels of the image data in the color space are then examined at step 106. In 122, a further examination of each pixel of image data is made to categorize the image content for billing (which may be based on color attributes of the image pixels). As shown, the processing at 122 can include determining at step 110 at least one color attribute of each of the plurality of pixels of received image data, that correlates to at least one perceptual image characteristics. The at least one color attribute will be used to determine or calculate a billing structure for the image. For example, a color attribute such as chroma may be determined. One or more color attributes may be used. The one or more color attributes may be pre-determined before image data is processed.

At 112, statistics for the plurality of pixels of image data are determined using the at least one color attribute. That is, statistical analysis of the pixels is performed using the at least one color attribute, but other statistics may be determined. For example, the statistical analysis may include determining more that one color attribute of the pixels as well as other information related to the pixels of image data. As will be further described below, in accordance with some embodiments, determining statistics at 112 comprises generating one or more histograms of pixel values using the at least one color attribute and color space components of the received image data.

The statistics are then analyzed at 114 to classify the image data into a category. Images may be classified into any number N of different categories. Categories may be determined based on pixel counts, thresholds, algorithms, et al. and are not meant to be limiting. For example, as noted above, categories can be pre-determined or adaptive. In an embodiment, the image may be classified into a category such as: monochrome, highlight color, bi-level, contone, discrete color, subdued color, low color, and full color, for example.

At step 116, a billing structure is then determined based on at least the classified category. Any number N of billing structures may be used and selected therefrom. In an embodiment, the number of billing structures is based on a number of categories for classifying the image data (or vice versa). The billing structures may be pre-defined or adaptive.

Optionally, after the billing structure is determined at step 116, the processed image data may be marked and output at 118 using a marking/output device (such as a printer, copier, or MFP/MFD).

In the above method 100, the billing structure for outputting the page is thus based on at least the statistics of at least one selected color attribute of the pixels of image data (the statistics being used to categorize the image data). That is, the billing structure is determined or selected based off of at least different categories of color usage (and not necessarily with marking material (e.g., ink) usage). In some embodiments, the billing structure may be determined based on calculations and/or used in conjunction with a plurality of rules. For example, the statistics and categorization at 112 and 114 are used to infer an intangible value in the input that the user has asked to be rendered and processed. That is, an expected or projected value to the user of outputting the input (the image as intended for output) is determined based on determinations at 110-114. Accordingly, at least the category is used to determine a billing structure that is acceptable to the user for outputting the input, Thus, the billing structure is determined based on at least a user's intention and perception of the input (as compared to conventional methods that solely rely on use and quantity of marking material(s) that are dispensed).

The billing structures used with the image processing apparatus or output device should not be limiting. In an embodiment, it is envisioned that the billing structure(s) may be determined or based on a threshold value. For example, in an embodiment, the chosen or determined billing structure is based on the category in which the device independent image data has been classified, as compared to a threshold.

In an embodiment, the billing structure can be based on a multi-tiered threshold value. The multi-tiered threshold value may be determined based on a number of categories for classifying the image data. That is, in one embodiment, based on its classification, the image data may be billed by choosing a billing structure, which in turn is associated with a tier that satisfies the thresholds. One or more thresholds may be used to separate billing tiers which may be used to charge a user. The billing tiers associated with billing structures can be extended and/or altered to N-tier billing systems, in accordance with some embodiments.

However, it is again noted any number or type of billing structures or methods can be used with this disclosure, and that tiers need not be used. Different billing methods or structures can be selected and applied to each category or content type of image data as determined in the image path. Moreover, it should be understood that the billing structures may be adaptive and/or altered.

Because this approach utilizes processing techniques to bill for color based on features as perceived by the human eye when output on a page, user satisfaction with regard to producing more accurate billing results for marked and output image data is increased.

The description below discloses exemplary embodiments that may be implemented by one or more modules or elements in an apparatus, a system, or a device for determining at least statistics for at least one color attribute in a received color space (and color space components) to categorize the image data based on the same, as noted in steps 110-114 in method 100 in FIG. 1 during the processing in 122. Such detection or determinations may be performed by a controller or processor (e.g., in the digital front end (DFE) or of front end image processing elements 704, as shown in FIG. 7), for example.

As mentioned, in accordance with some embodiments, determining statistics as noted at 112 in FIG. 2 comprises generating one or more histograms of pixel values using the at least one color attribute. A histogram as used herein is a graphical representation showing distribution of data, such as a plot or graph, of any dimension.

Figure 3:
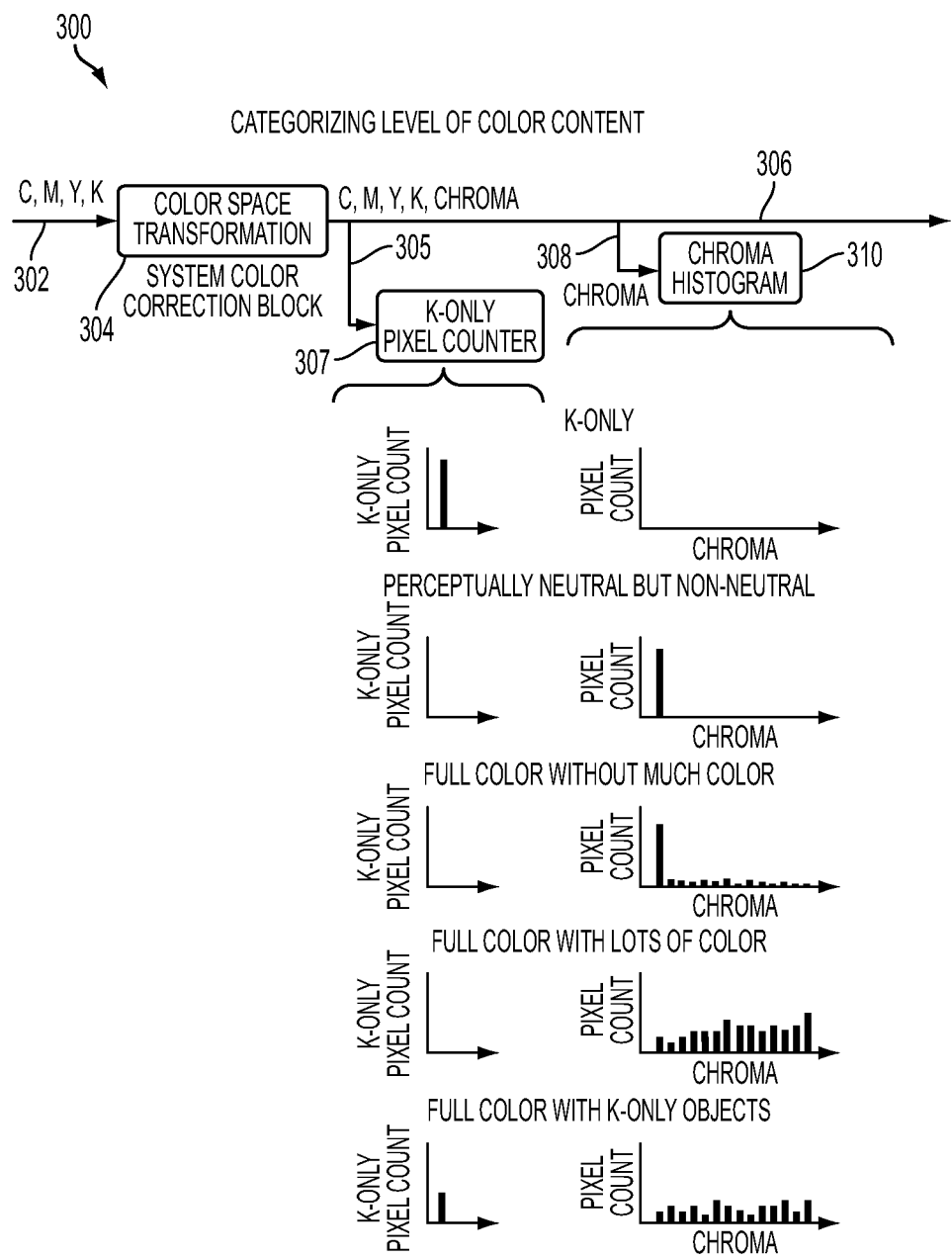
FIG. 3 illustrates an exemplary flow diagram illustrating a method for using chroma as a color attribute for image data and determining related histogram data to be used for billing in accordance with an embodiment of the present disclosure.

FIG. 3 illustrates a flow diagram illustrating a method 300 for using chroma as at least one color attribute for image data, and determining related histogram data to be used for billing in accordance with an embodiment. Method 300 of FIG. 3 can be a part of the processing steps (e.g., part of processing 104 or 122) that are applied to image data. It is used to categorize a level of color content based on chroma. Specifically, image data is input at 302 in a color space. The image data may be in a CMYK color space, for example. A color space transformation is performed at 304 by a color correction block, if needed, to convert device dependent data into device independent data. Statistics are then determined for K-only pixels and for chroma. More specifically, 305 represents obtaining data relating to K-only pixels (where values of C=zero, M=zero, and Y=zero) in the received image data, so that they are counted by a K-only pixel counter 307. (Chroma or other color attributes are ignored.) Data relating to chroma of the pixels in the received image data is obtained at 308, and a chroma histogram is calculated at 310. The chroma histogram 310 is configured to determine pixel counts for each determined chroma represented by the pixels of image data. For example, as each pixel is processed, counts relating to chroma are tallied. After such statistics are gathered, the results are analyzed to classify the image data (as a whole) into a category. This category is then sent as shown at 306 for processing and analysis (e.g., by a billing calculation element such as 720 in FIG. 7) to determine a billing structure (e.g., as shown at 116 in method 100) for the received image data.

For example, FIG. 3 illustrates five example histograms and corresponding categories for which image data may be classified—e.g., K-only, perceptually neutral but non-neutral, full color without much color, full color with lots of color, and full color with K-only objects. In addition to the histogram data, color space components of the received image data may also be determined and used for determining image statistics, so that the categorization of image data into a category can consider such color space components. In the first, top most histogram, for example, the statistical analysis on the image results in no chroma count and K-only pixels (K being the color space component). This results in a categorization of black and white image data that can be used for billing. In the next graph, a single chroma (or color) was determined to be used in the image data, with no K pixels, which can correspond to a perceptually neutral but non-neutral image data. Similarly, the remaining three histograms show other embodiments wherein pixel counts for each chroma and different color space components are determined, and, based on the results as combined with color space components, an image can be categorized in a category (e.g., full color without much color, full color with lots of color, and full color with K-only objects (having counts for multiple chroma values of pixels as well as K-only pixels)).

Accordingly, method 300 of FIG. 3 illustrates one example of collecting a histogram of a measure of image chrominance (or neutrality) with bin boundaries so as to differentiate between two or more categories of images with respect to color content. For example, as noted by the paragraphs above, pixels of image data can include K-only image data (rendered with only black colorant) neutrals, process (or "rich" or "composite") neutrals that are indisputably neutral to a human observer), process neutrals that are debatably neutral, or indisputably colored content.

Figure 4:
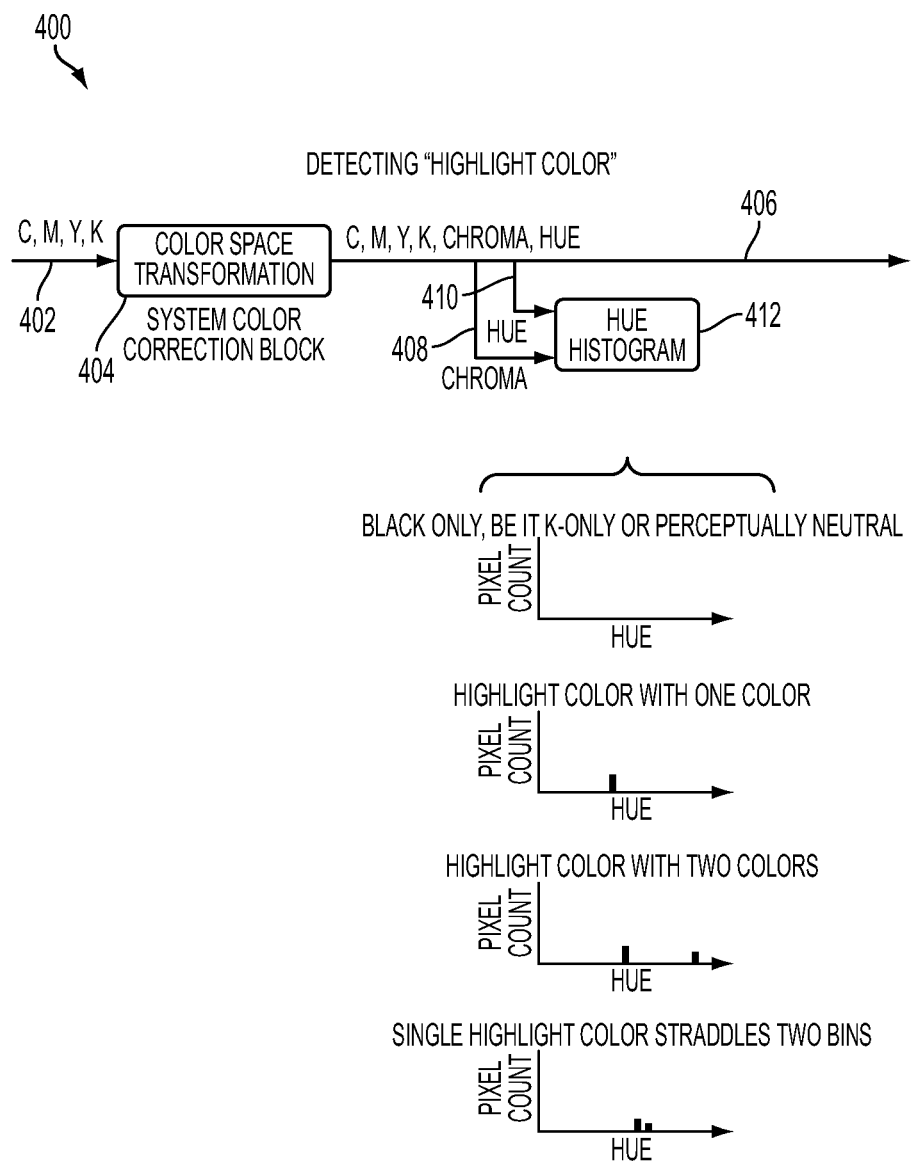
FIG. 4 illustrates an exemplary flow diagram illustrating a method for using hue as a color attribute for image data and determining related histogram data to be used for billing in accordance with another embodiment of the present disclosure.

In addition or alternatively to detecting a color attribute such as chroma, another color attribute may be statistically analyzed. FIG. 4 illustrates an embodiment of a flow diagram illustrating a method 400 for using hue as a color attribute for received image data and determining related histogram data for the same in order to determine a billing structure. In particular, method 400 illustrates how a hue histogram can result in a determination of different categories of highlight color. Method 400 can be a part of the processing steps (e.g., part of processing 104 or 122) that are applied to image data. As shown, image data is input at 402 in a color space. The image data may be in a CMYK color space, for example. A color space transformation is performed at 404 by a color correction block, if needed, to convert device dependent data into device independent data. Statistics based on chroma and hue are determined in this embodiment. Data relating to both chroma and hue of the received image data is obtained at 408 and 410 and used to determine a hue histogram at 412. Chroma data (or chroma statistics) can be used to form the hue histogram at 412 to inhibit inclusion of neutral and very low chroma pixels in the hue histogram. It can exclude any white background and/or black foreground pixels from being incorporated into the histogram, for example. The hue histogram 412 is configured to determine pixel counts for each determined hue represented by the pixels of image data. For example, as each pixel is processed, counts relating to hue are tallied. After such statistics are gathered, the results are analyzed to classify the image data (as a whole) into a category. This category is then sent as shown at 406 for processing and analysis (e.g., by a billing calculation element such as 720 in FIG. 7) to determine a billing structure (e.g., as shown at 116 in method 100) for the received image data.

For example, FIG. 4 illustrates four example histograms and corresponding sub-categories for which image data may be classified—e.g., the main category being highlight color, with the sub-categories being, e.g., K-only or perceptual neutral, highlight color with one color, highlight color with two colors, and single highlight color straddling two bins. It should be noted that while not shown, statistics based on color space components (such as a K only counter shown in FIG. 3) may also be determined (e.g., concurrently). However, FIG. 4 is used to show a simplified version of the detection of highlight color. If there is no color in the image data (i.e., if the pixels represent K only or composite black image data which looks neutral), then the histogram would be empty. This is shown by the first, top most histogram. There would be no pixels that have any chroma or any hue because pixels that have very low chroma would be excluded from incrementing the histogram bits. If there is only one color, then there would just be a spike in the histogram, such as shown in the second, next histogram. A single bin would be incremented. In the case wherein two colors are used, e.g., some blue and red, as shown by the third histogram, two colors would be determined as highlight colors.

In some cases, because the histogram does not have infinite resolution, a hue corresponding to a color or color space component color could happen to straddle the boundary between two bins, such as shown by the fourth example histogram. This is possible because image data is, in some cases, not a single pure color (even if a single color is intended) but has a spectral distribution, commonly originating from electrical or photonic noise in a physical system involved in the creation of the image data. In some embodiments, as each of the pixels of image data are being processed, hues of color components can be selected or alternatively incremented. Although data from a machine or processor can determine that the count would fall in one hue/color bin or another, image data that has been scanned or manipulated may include noise and/or a variations in the image data. So, there can be hues that are determined by the processor(s) to land on a boundary between two color bins. Such can result in either a selection of one of the bins, or in incrementing both bins in the histogram. Alternatively, to reduce and/or eliminate straddling of hues, a supplier can utilize a larger number of bins corresponding to a higher resolution in hue, this providing better information for differentiating multiple similar colors from a single color.

Accordingly, method 400 of FIG. 4 illustrates one example of collecting a histogram of a measure of image hue so as to enable recognition that a page (or other unit of image) contains only neutral and a limited number of colors, i.e., "highlight color," that might be billed at a different rate given its value above that of neutral and lower than that of full color. This allows a user to create and use any color of his choice. The selected billing structure can allow for use of one, two, or more highlight colors.

Figure 5:
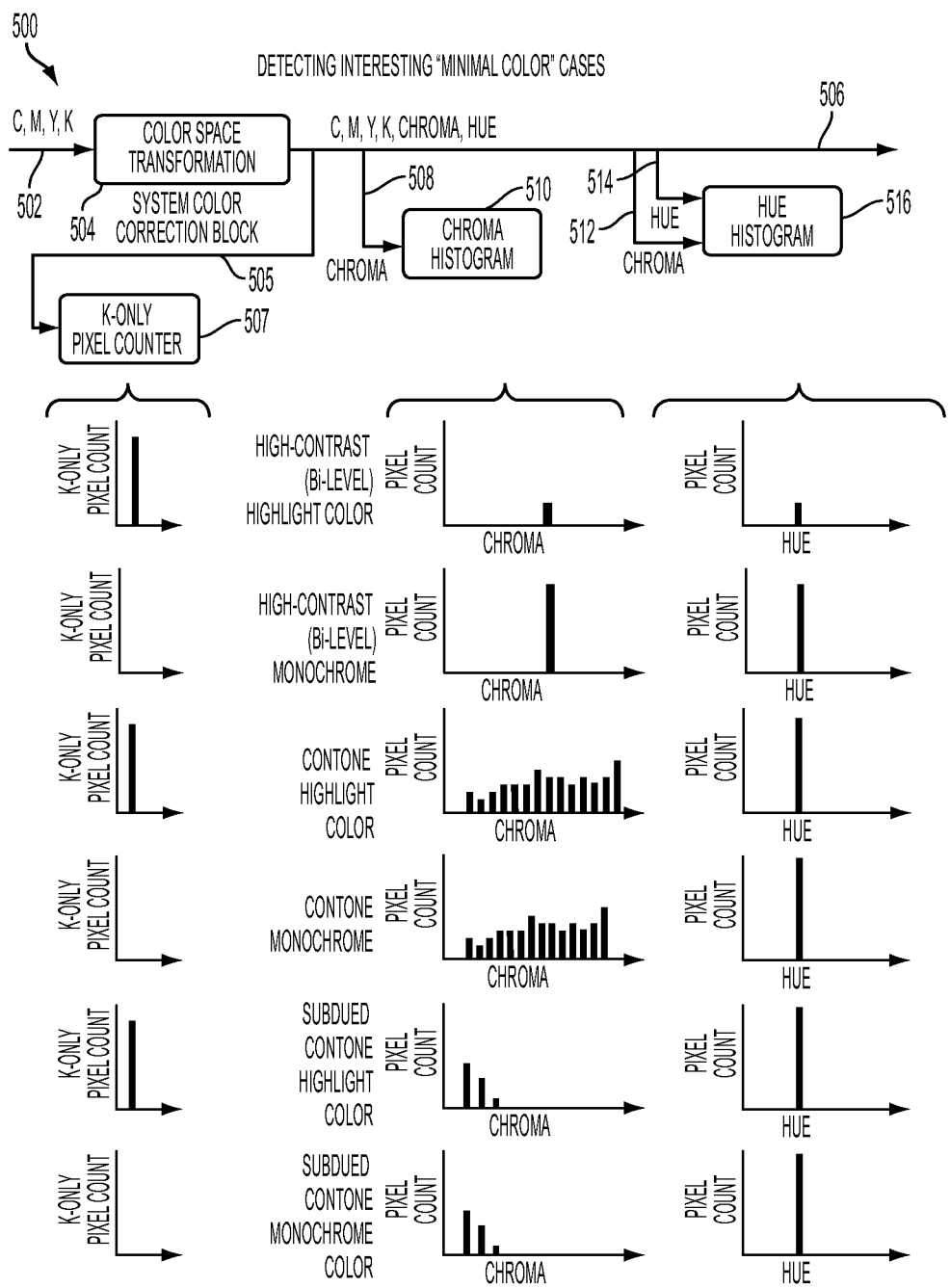
FIG. 5 illustrates an exemplary flow diagram illustrating a method for using chroma and hue as color attributes for image data and determining related histogram data to be used for billing in accordance with another embodiment of the present disclosure.

FIG. 5 illustrates another embodiment showing a method 500 for using chroma and hue as color attributes for image data and determining related histogram data for both to be used for billing. Method 500 leverages both a chroma and a hue histogram to recognize simple minimal color cases that are not recognizable from either a chroma or a hue histogram alone. For example, if a user looks at a printed page that perceivably (by the human eye) has minimal printed color, the user would not want to get charged for a printed page of full color. Method 500 may be may be effective when distinguishing between such instances, including bi-level monochrome images, contone monochrome images, and full color images, for example.

Method 500 can be a part of the processing steps (e.g., part of processing 104 or 122) that are applied to image data. As shown, image data is input at 502 in a color space. The image data may be in a CMYK color space, for example. A color space transformation is performed at 504 by a color correction block, if needed, to convert device dependent data into device independent data. Color space components can be determined, including determining a K-only pixel count. 505 represents obtaining data relating to K-only pixels (where values of C=zero, M=zero, and Y=zero) in the received image data so that they are counted by a K-only pixel counter 507. (Chroma and hue data is not used or ignored when gathering K-only data.) Statistics based on chroma and hue are also determined. Data relating to both chroma and hue in the received image data is obtained at 508 and 514, respectively, and used to determine a chroma histogram at 510 and a hue histogram at 516, respectively. Chroma data (or chroma statistics) can also be used at 512 to form the hue histogram at 516 to inhibit inclusion of neutral and very low chroma pixels in the hue histogram. It can exclude any white background and/or black foreground pixels from being incorporated into the hue histogram at 516, for example. The chroma histogram 510 is configured to determine pixel counts for each determined chroma represented by the pixels of image data. For example, as each pixel is processed, counts relating to chroma are tallied. The hue histogram 516 is configured to determine pixel counts for each determined hue represented by the pixels of image data. For example, as each pixel is processed, counts relating to hue are tallied. After such statistics are gathered, the results are analyzed to classify the image data (as a whole) into a category. This category is then sent as shown at 506 for processing and analysis (e.g., by a billing calculation element such as 720 in FIG. 7) to determine a billing structure (e.g., as shown at 116 in method 100) for the received image data.

For example, FIG. 5 illustrates six examples of sets of histograms (a set being a chroma histogram and a hue histogram) and corresponding categories for which image data may be classified—e.g., high-contrast (bi-level) highlight color, high-contrast (bi-level) monochrome color, contone highlight color, contone monochrome color, subdued contone highlight color, and subdued contone monochrome color. In addition to the histogram data, color space components of the received image data may also be determined and used for determining image statistics, so that the categorization of image data into a category (such as the shown example categories) can consider such color space components. In the first, top most histogram, for example, the statistical analysis on the image results a single chroma (color) count in one hue and K-only pixels (K and the one color being color space components). This results in pixels of black and a single color, for example, which could categorize the image data into a category of high-contrast, bi-level highlight color. In the next graph, a single chroma (or color) in one hue was determined to be used in the image data, with no K pixels, which can correspond to high-contrast, bi-level monochrome image data. The remaining four histograms show other embodiments wherein pixel counts for each chroma, hue, and different color space components are determined, and, based on the combined results, an image can be categorized a category. For example, there can be pixels with no chroma or pixels with a lot of chroma. In the example embodiments, each of the hue histograms indicate pixels in one hue. These examples would indicate a highlight color, because it shows that there is only one hue and that the pixels either have no chroma or high chroma (which means that it must be binary). Some of the example histograms include K-only pixels. The examples that include K-only pixels combined with their chroma and hue histograms indicate highlight color, such as contone highlight color or subdued contone highlight color, for example. For those shown in FIG. 5 without a K-only pixel count, the combined results indicate monochrome color when combined with the chroma and hue histograms, such as contone monochrome color or subdued contone monochrome color. Of course, one of skill in the art would understand that the illustrated set of histograms, color space components, and their resultant categories are exemplary and are not limiting.

The methods in FIGS. 3-5 illustrate examples of one dimensional histograms that are used (with color space components) to categorize the received image data. However, in accordance with yet another embodiment, it is envisioned that data relating to a two dimensional histogram may be collected to measure image chrominance (or neutrality) and hue (as described above) to enable recognition of other restricted color content categories which might be billed differently than monochrome, highlight color, or full color. For example, two dimensional histograms may be used to differentiate between images comprising bi-level color, contone monochrome color, full color, or discrete color.

Figure 6:
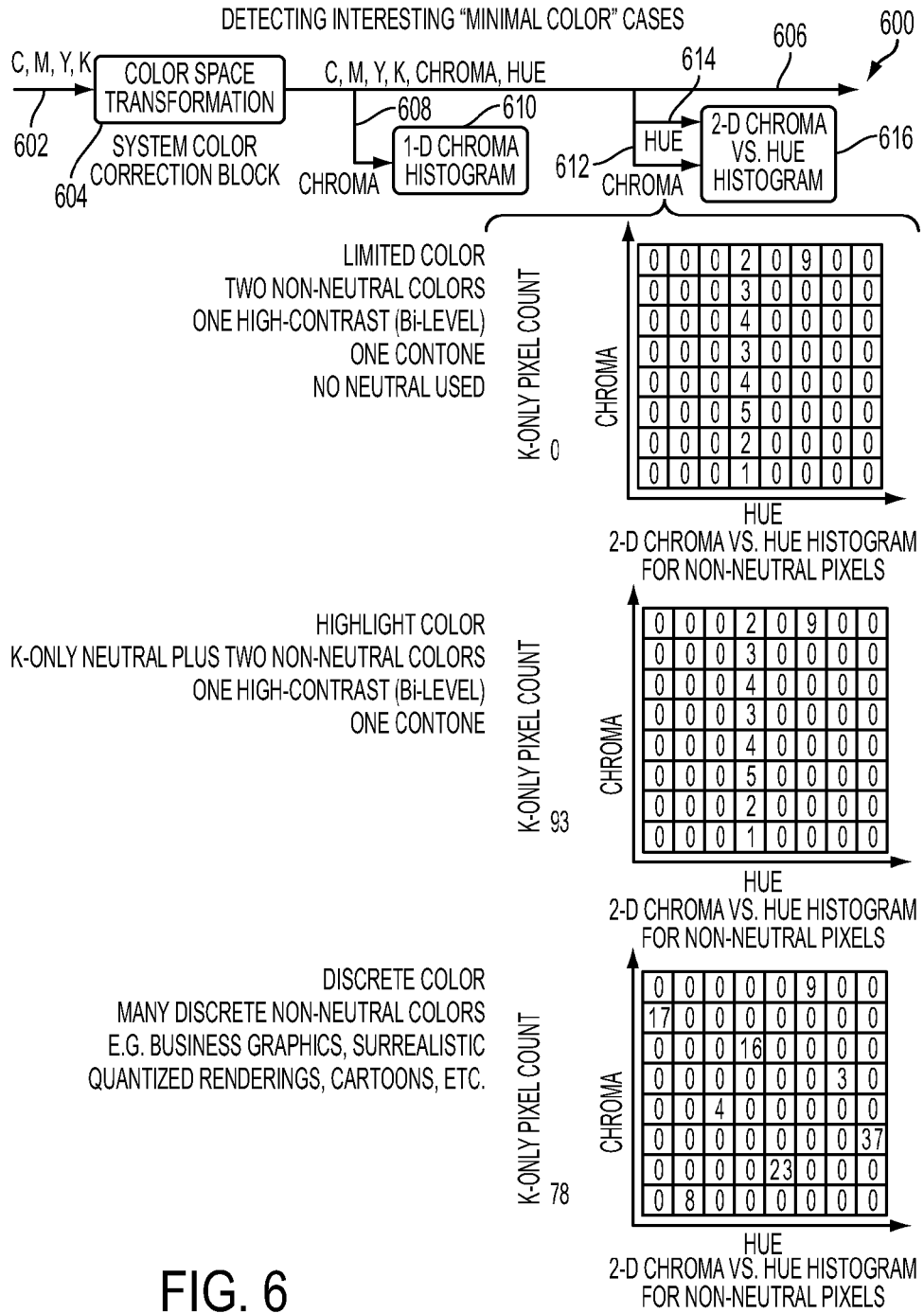
FIG. 6 illustrates an exemplary flow diagram illustrating a method for using chroma and hue as color attributes for image data and determining related histogram data to be used for billing in accordance with yet another embodiment of the present disclosure.

FIG. 6 illustrates an exemplary flow diagram illustrating such a method 600 for using chroma and hue as color attributes for image data and determining related two-dimensional histogram data to be used for billing. Method 600 can be a part of the processing steps (e.g., part of processing 104 or 122) that are applied to image data. It is used to categorize a level of color content based on chroma and hue. As shown, image data is input at 602 in a color space. The image data may be in a CMYK color space, for example. A color space transformation is performed at 604 by a color correction block, if needed, to convert device dependent data into device independent data. Statistics based on chroma and hue are determined. Data relating to chroma and hue in the received image data is obtained at 608 and 614, respectively. Chroma data is used to determine a one dimensional (1-D) chroma histogram at 610. For example, data related to the CMYK image data may be gathered at 608 and used by chroma histogram at 610 to determine K-only pixels (e.g., like a counter). Hue data from the received image data is also used along with chroma data to determine a two dimension (2-D) hue histogram at 616. Chroma data (or chroma statistics) can also be used at 612 to form the hue histogram at 616 to inhibit inclusion of neutral and very low chroma pixels in the hue histogram. It can exclude any white background and/or black foreground pixels from being incorporated into the hue histogram at 616, for example. Alternatively, chroma information may be determined by analyzing the 2-D histogram determined at 616. The 2-D hue histogram 616 is configured to determine pixel counts for each permutation of determined chroma vs. hue as represented by the pixels of image data. For example, as each pixel is processed, a count is maintained of each permutation of chroma vs. hue with each attribute quantized based on the resolution required for the application. These counts can be thought of as a 2-D matrix, since that reveals the relationship between the counters. After such statistics are gathered, the results are analyzed to classify the image data (as a whole) into a category. This category is then sent as shown at 606 for processing and analysis (e.g., by a billing calculation element such as 720 in FIG. 7) to determine a billing structure (e.g., as shown at 116 in method 100) for the received image data.

For example, FIG. 6 illustrates three examples of sets of histograms (a set being a chroma histogram and a hue histogram) and corresponding categories for which image data may be classified. In addition to the histogram data, color space components of the received image data may also be determined and used for determining image statistics, so that the categorization of image data into a category (such as the shown example categories) can consider such color space components. In the first, top most histogram, for example, there is shown an exemplary case where only two non-neutral (highlight) colors are used on an entire page. The middle histogram illustrates the same two non-neutral color example with the addition of black (K) ink, that could be creating black or shades of neutral (gray). The bottom histogram illustrates the case where multiple colors are specified, which span a range of hue and chroma.

It should again be noted that the categories (and sub-categories) described in the flow diagrams and methods 300-600 in FIGS. 3-6 are not meant to be limiting. In an embodiment, some categories of images can be defined to be fairly indisputable or pre-determined. For example, a boundary categorizing image data as "monochrome" can be set at a value (or values) high enough on the chroma scale, such as multiple units of visual color difference, deltaE, so that a user could not point to an image (or document) that is outside of the boundary and claim that it does not have color content. The value of this boundary deltaE may be subjective, and vary from person to person, as well as with viewing conditions. In an embodiment, this value may be in a range of about five to about ten deltaE. As another example, to set a boundary for the category of highlight color, a range of hues allowed to be considered to be a single color could wide enough so that the range of colors captured will be perceived as different by all human observers, and coupled with billing definitions specifying "one single color." Most or all of the categories described and illustrated in this disclosure can be set up with indisputable boundaries. In some embodiments, however, a customer (or supplier or user) may wish to include an arbitrary or subjective boundary for determining or dividing each of the categories used to categorize the image data. For example, image data that is determined to be of a category that is "subdued" or "low" can entail setting a value for such boundaries, as adjusting them as needed.

One of skill in the art should understand that the words associated with the herein described categories can be altered or changed in place of current schemes. Also, the associated defining words for each category can be chosen to describe a reasonable and intuitive category that is useful and that has correlation to the image metric used, as opposed to prior billing schemes that specify a numerical pixel count per page without regard to proximity of those pixels, and so have no correlation to perceivable color content. Accordingly, there are other useful and intuitive categories that can be recognized in addition to those described herein.

Accordingly, each of the methods 300-600 in FIGS. 3-6 are examples of implementing processing of image data as disclosed in method 200 of FIG. 2 to discern and bill for different levels of use of color in an image that is output. The method 200 aims to use processor-implementation to simulate human judgment of a printed page, by creating histograms of color attributes, such as chroma and hue. As shown, calculating chroma and hue histograms requires one or two more tetrahedral interpolations. The histogram data is then used to determine the degree of color usage in a way correlating to how a person would think of it (i.e., classifying the received image data into a category based on how it would be perceived by the human eye), which can subsequently be used to determine billing. The image is categorized according to multiple, ideally orthogonal characteristics so that categories of image color content can be recognized.

The intent is to offer billing for intermediate levels of color usage to provide a better match to user needs, increasing the potential market as well as to provide stepping stones to ease the user into color usage (and color output). By determining and billing the value of what is output according to the user's point of view, e.g., the user's intended or perceived view of what is input and then printed in an output document, the user is more satisfied with the billing process. The billing category boundaries can be tailored based on human perception of one or more color attributes (e.g., chroma, hue, value and/or brightness), or other color space components (versus mechanical pixel counts that are blind to intended perception). Pages can be billed on an individual basis, and costs can be altered (e.g., lowered) as needed.

For example, it may be desirable for billing purposes from a user's point of view to consider neutral pixels that are imperceivably close to neutral (by the human eye) to be in the same category as true neutral pixel. A user may consider that a single hue non-neutral document has only a little value over a neutral document. A highlight color with neutral and one hue may be worth a little more, while a neutral document with a small amount of full color is worth even more. Two or three highlight colors might be of comparable worth. A full color document may be worth a lot, whereas a full color document (e.g., where everything is close to neutral) may be worth less. Accordingly, this disclosure aims to decipher between each of these types (categories) of documents and use such information for billing purposes.

Any number of methods may be used with the herein disclosed method and/or system to determine color space components and any corresponding attributes of the image data in a color space. The method or methods used for determining color attributes (or lack thereof) are not limited. Moreover, the use of chroma and hue in one or two dimensional histograms (as described above) are non-limiting examples. In accordance with an embodiment, the method is configured to determine and statistically analyze value (or brightness) in conjunction with chrominance and/or hue. The statistics may be collected in a 2-D histogram, for example. Value can be used with another histogram to recognize low cost/draft/economy mode documents for billing, for example.

It should also be noted that optional color dependent filter(s) may be applied during analysis of the determined statistics/histogram data. For example, the filter(s) may be used to comprehend the human visual system response to small features by manipulating the image data so as to produce or achieve a response approximating a person's perception with respect to neutrality or multiplicity of hues. The filter response (in pixels) is designed based on features in image data that are perceived by the human eye (e.g., an angle over which variation occurs). This prevents single pixels or small groups of pixels that would not be distinguished by the human eye from being counted according to their individual chromatic content, but instead causes them to be blended as a human observer would perceive them in the context of the larger document. For example, for a viewing distance of about 18 inches, a 2-dimensional low pass filter with a cut off frequency of about two cycles per millimeter would result in calculating color attributes such as hue or chroma as an average of all pixels within every half millimeter area, much as the human eye averages over a similar area. As a result, intense isolated pixels or small features would be treated not as their isolated intense characteristic, but as an average of the color component in the surrounding neighborhood. Another possibility comprises eliminating pixels with extreme color component values using a filter (such as a median filter). In accordance with some embodiments, the resolution of the image and the viewing distance are considered for designing the filter.

Such filter(s) can also eliminate a need during the determination of the billing structure to overlook a large number of high-tier pixels (e.g., color pixels) that could be in close proximity (resulting in a high-tier object in an image or a document), in order to not misclassify widely scattered high-tier pixels that do not result in visible value on the page for the user.

In another embodiment, the disclosed method can be used to automatically recognize constrained area coverage pages (such as those that might be produced by draft/economy modes or artistic effect) by histogramming value/brightness and observing no or few pixels populating darker histogram bins.

In yet another embodiment, a three dimensional histogram employing chroma, hue, and value/brightness can also be implemented to recognize additional categories of image data and to distinguish any union of several simpler modes from a single more complex mode (such as full color).

Although throughout this disclosure histograms have been described as an implementation for determining and analyzing statistics for the plurality of pixels using one or more color attributes, it should be understood that other analysis methods can be used. For example, it is within the scope of this disclosure to use look up tables or other mathematical models when processing image data, such as, but as not limited to, methods that utilize average, standard deviation, mean, and/or median of data. In an embodiment, a 3 or 4 dimensional tetrahedrally interpolated lookup table technique can be implemented for a system's color space transformation (e.g., as shown by 304, 404, 504, and 604). In such a technique, an N-dimensional sub-sampled lookup table (e.g., 3 or 4 dimensional) is indexed to locate the nodes surrounding the N-D input point in a hypercube. These surrounding nodes contain values of the outputs at those node locations. An N-D interpolation is then performed for each of the outputs to approximate those outputs at the input point, which is floating between the identified table nodes.

The additional outputs used to provide the quantities determined by this disclosure do not add any complexity, only volume, to the implementation. For each additional output quantity, each node in the table must carry an additional quantity (the value of that output at that node position), and an additional N-D interpolation operation is implemented to approximate the output at the input point.

The herein described method and/or implementations may be used by any MFD (or printer or copier) manufacturing companies that wish to implement histogram and billing techniques. Moreover, implementation of this method does not require much change to existing processor(s) or systems. For example, if a system or processor contains a color space transformation, the quantities to be histogrammed may be easily generated through an extension of that module, introducing only a small incremental cost and no increase in system complexity. As noted below, the method may be implemented by hardware and/or software in existing systems or added to systems for implementation.

FIG. 7 illustrates a block diagram of an example of an image path 700 for processing image data of a system, device or image processing apparatus 703, for classifying and billing for images (e.g., output as documents) using the method of FIG. 1 according to an embodiment. The apparatus 703 comprises, among other devices, an input device (e.g., IIT or memory) 702, a processor or processing elements represented by 704 and 710, a memory 706 and/or a storage device 708, and an output device (e.g., image output terminal (IOT)) 714 with a marking engine interface 712. The image path 700 of the system 703 may also include one or more examination and analyzation elements 718 which may be a part of the system 703 itself or in communication with the processing elements 704 and 710, for example. Generally, the above elements (as will be described) of the device are provided to perform functions that assist in receiving image data such as a scanned document, configuring the image path of the processing elements 704 and 710 (and possibly elements 718 and 720) to process the image data, and, if needed, outputting the image data such as by printing a document according to an output mode that may be selected. However, it should be noted that the apparatus or device may comprise additional elements not described herein or alternative elements for performing similar functions, and should not be limited to those elements as illustrated in FIG. 7. Generally, the image path shown in FIG. 7 corresponds to any number of output modes that may be selected for an image processing apparatus, system, or device.

The input device 702 is used to deliver image data (e.g., of a document) to the system 703 and/or processing elements in the image path. In some embodiments, the input device 702 is used to scan or acquire an input document 701 or page into image data, such as when copying a document, for example. The input device 702 may be a digital scanner, for example. Generally, however, any device used to scan or capture the image data of a document for an image processing apparatus may be used. For example, the image data may be captured by a scanner in a copier, a facsimile machine, a multi-function device, a camera, a video camera, or any other known or later device that is capable of scanning a document and capturing and/or inputting electronic image data. The input device 702 may include submission of electronic data by any means and should not be limiting. In other embodiments, the input device 702 may be an electronic device for inputting electronic image data. In some embodiments, input device 702 may be connected to a communication network 722 or telephone system, for example, to receive as input image data such as via a facsimile (fax) machine or computer (CPU). Input documents and/or image data that is received electronically may be received via a telephone number, an e-mail address, an Internet Protocol (IP) address, a server, or other methods for sending and/or receiving electronic image data. The network may be a digital network such as a local area network (LAN), a wide area network (WAN), the Internet or Internet Protocol (IP) network, broadband networks (e.g., PSTN with broadband technology), DSL, Voice Over IP, WiFi network, or other networks or systems, or a combination of networks and/or systems, for example, and should not be limited to those mentioned above.

If needed, the input or received image data may be converted using the input device 502 and/or processing elements in the apparatus 703. For example, in embodiments, the image data may be converted from device dependent space to device independent space (e.g., RGB to L*a*b). Alternatively, the image data may be received in device independent space (e.g., L*a*b or PostScript). The type of image data received and the type of input devices documents are received therefrom should not be limiting.

In any case, image data, such as image data for an original document 701, may be received or input in either device dependent or device independent space from the input device 702, depending on the capability of the input device or the architecture of the system. The input device 702 may capture image data as binary or contone image data, for example. Generally, when the input image data from the input device is received in device dependent space, the processing elements in the image path will typically convert such image data to some device independent space for further processing before converting the image data to device dependent space (e.g., to be output). The input and output devices deal with different device dependent color spaces, and most of the image processing in the image path 700 is performed in a device independent space to produce output images of the highest possible quality.

FIG. 7 also shows a processor or processing elements for processing and/or manipulating image data using a plurality of operations and/or processes. The description of the processing elements below is an example of devices capable of implementing processes to be performed and should not be limiting. A "processor"—which are also referred to as processing elements or modules in this disclosure—may be a CPU that executes a series of instructions out of memory, or a gate-level hardware implementation, as will be further understood by the description herein. Additional processing elements may be provided along the image path 700. Additionally and/or alternatively, additional operations may be performed on the image data other than or in addition to those described with reference to these figures.

The image path 700 of system 703 may comprise a plurality of image processing elements (or processor) for manipulating image data received from the input device 702 using a plurality of operations and/or processes. The processing elements may be a combination of image processing elements which comprise software and hardware elements that perform a number of operations on the image data received from the input device 702 (e.g., scanner, memory, or other source) using a set of parameters. The parameters are used to convert the images to the format desired as output (e.g., high quality) along the image path. The processing elements may be a part of a computer system, device, or apparatus such as a xerographic system, a photocopier, a printing device, or a multifunction device (MFD). For simplicity purposes, the term "processing element" throughout the application will refer to one or more elements capable of executing machine executable program instructions. It is to be understood that any number of processing elements may be used and that additional operations or processes besides those described below may be provided in an image path.

More specifically, the image path of FIG. 7 comprises a front end processing element(s) 704, a memory 706, storage 708, and a back end processing element(s) 710. Each of the devices or elements in the image path may be communication with each other, as represented by path 707. The front end processing element(s) 704 may comprise any number of processing elements/modules and is/are image processing elements that receive image data in a beginning of an image path and is/are used to process the image data according to user preferences such that it may be stored and later retrieved for output. The back end processing element(s) 710 may comprise any number of processing elements/modules and is/are generally used at the end of an image path to retrieve stored image data and to process the image data such that the image data may be output to a printing device as an accurate recreation of the original input or scanned image. Of course, processing elements may also be used for compression and/or decompression of image data.

In an embodiment, one or more of the elements (e.g., processing elements 704, 710 and memory 706/storage 708) of system 703 may be connected to a network 722 or telephone system, for example, for communication with other devices, systems, or apparatuses. For example, in some cases, image data or executable instructions may be provided via a computer (CPU) connected to the network 722. As further described below, in a possible embodiment, at least one processing element of system 703 may implement an operative set of processor executable instructions of a billing system. Such a billing system or the executable instructions may be provided via the network 722, for example.

Each of the image processing elements comprises an input and an output. Additionally, the system, device, or apparatus may also include one or more controllers or routers (not shown) to select and route the image data between the processing elements 704 and 710 and memory 706 and/or storage 708, and other elements described below, for example.

Front end processing element(s) 704 receives (e.g., as input) the image data from the input device 702 and processes the image data. The image data may be received as input via a scanning engine interface, for example, such as when copying and turning a hard copy document into image data. Alternatively, the image data may be received electronically, such as from a memory device, storage device (portable or remote), et al., such as when printing a saved document. As such, the form in which image data is received should not be limiting. Front end processing element(s) 704 may be used to process the scanned image data as well as determine user-defined operations generally known in the art. For example, the front end processing element 704 may be used for color space conversion, reduction or enlargement, document registration, and/or performing other operations or processes on the image data, for example. In some embodiments, the front end processing element 704 converts the image data (e.g., from device dependent to device independent image data, when received via a scanner) for processing. For example, one or more color attributes can be created (ripped by a Raster Image Processor (RIP)) and analyzed here. Front end processing element 704 may be used (alone or in cooperation with other elements) to determine a billing structure, such as noted at 116 of the method 100 in FIG. 2 and for image classification. Alternatively, color attributes can be created in different places in the image path, for instance further downstream in the print or marking engine.

Memory 706 and/or storage 708 may be used to store image data. For example, memory 706 and/or storage 708 may be used to temporarily store the original image data (e.g., of a document) input via input device 702. Converted (e.g., binary to contone image data) or compressed image data may also be stored in the memory 706 and/or storage 708. Memory 706 and/or storage 708 may be used to store machine readable instructions to be executed by the processor/processing elements. The memory 706 and/or storage 708 may be implemented using static or dynamic RAM (random access memory), a floppy disk and disk drive, a writable optical disk and disk drive, a hard disk and disk drive, flash memory, or the like, and may be distributed among separate memory components. The memory 706 and/or storage 708 can also include read only memory, or other removable storage drive(s) or memory devices.

The front end processing element(s) 704 may communicate with memory 706 and/or storage 708 of system/apparatus 700 to store processed and/or compressed image data, for example. Compressed image data may be stored in memory 706 and/or storage 708 temporarily or for a later time when needed. When the image data is needed or it is time for marking (e.g., using the marking engine interface 712 of output device 714), the image data may be retrieved from memory 706 and/or storage 708 via the back end processing element(s) 710 to export the image data that has been scanned, for example.

Back end processing element(s) 710 can receive processed image data from the memory 706 or storage 508. Back end processing element (s) 710 may be used to further render the image data for output. For example, back end processing element 710 may be used to convert the color space of the processed image data (e.g., convert from device independent CIE L*a*b color space to device dependent CMYK color space), provide color balance, further rendering, filtering, and/or other operations or processes. Subsequently, back end processing element(s) 710 may be used to decompress the image data and output the image data via the marking engine 712 and output device 714. The output of processed image data from the back end processing element 710 depends on the image path (or output mode). The back end processing element(s) 710 may be used for calculating the amount of CMY color coverage and/or to determine the toner/ink consumption of the output device 714 (e.g., to inform a user that ink needs to be replaced, for example).

In an embodiment, the processed image data may be directly output to the marking engine interface 712 for printing using an output device 714. The marking engine interface 712 may be associated with an output device 714 such as a printer, a copier, or an MFD which is used for printing documents. In some cases, the marking engine interface may be a part of the output device 714, as shown in FIG. 7. In some cases, the marking engine interface may be separate from the output device 714. The marking engine interface 712 is used to output the processing image data to the printer, for example. Specifically, the marking engine interface 712 may be designed to receive the reconstructed and processed image data in device independent space in order to send or output the image data via the output device 714 (e.g., printer) for a copy or print job. The marking engine interface 712 may further perform image processing on the image data to make corrections or compensate for deviation in the printing process. Alternatively, the back end processing element(s) 710 may be used to perform further image processing on the image data.

The marking engine interface 712 outputs processed image data to the output device 714 for outputting the image data. The type of output device 714 should not be limiting. For example, the output device 714 may comprise an image output terminal (IOT), printing device, copying device, or MFD, and may include other devices (e.g., display, screen), as generally noted above. The display or screen may be a part of a computer (CPU) or user interface (UI), a digital communication device, a camera, and/or may be provided to relay information from a website or other device via a network 722, for example. In some cases, a UI may be provided directly on the apparatus/device, while in others a UI is provided as a separate electronic device.

It should be noted that the output print quality of image data from an output device 714 such as a MFD may depend on the type of system or device (and its available output modes/resolution). In some cases, multiple print quality modes (PostScript driver), each with a different resolution, are supported. Of course, the algorithms and processes used by the elements in the image path shown in FIG. 7 should not be limiting. Any number of data compression algorithms (e.g., lossless, lossy), decompression algorithms, color conversion algorithms (e.g., contone to binary, or binary to grayscale) and the like may be performed on the image data (in addition to method 100) to provide a high quality output document 716.

In an embodiment, the system or apparatus 703 may further comprise one or more elements for determining a billing structure and/or a billing cost for outputting a page or document via an output device such as device 714. For example, one or more examination (and analysis) elements 718 and/or billing calculation element 720 are provided in at least in communication with system 703. In an embodiment, the examination element 718 and/or billing calculation element 720 may be a part of the image path 700 of system 703. In an embodiment, the elements 718 and/or 720 are separate from the image path of the system 703. In an embodiment, the features, calculations, and/or determinations provided by examination element 718 and/or billing calculation element 720 may be incorporated into one or more processing elements, such as elements 704, 710, or 712, and therefore such elements should not be limited to the illustrated embodiment. Also, the features, calculations, and/or determinations should not be restricted to receiving information from front end processing element 704 and back end processing element 710.

Examination element 718 may be configured to examine the image data. The examination element 718 may assist in determining and classifying the image data. For example, the examination element 718 may be configured to perform any of the steps in FIGS. 3-6. The illustrated examination element 718 represents one or more modules or elements that can be used to implement the herein disclosed processing techniques. For example, FIG. 8 illustrates an embodiment showing a flow method 750 wherein examination element 718 comprises multiple modules configured to process received image data as disclosed in method 200 and output image data and/or at least its categorical information to determine a billing structure. More specifically, in the illustrated embodiment, examination element 718 comprises a color attribute module 754, a statistical analysis module 756, and document recognition (or categorization) module 758. Each of these modules may be separate or joined. Color attribute module 754 may be configured to determine at least one color attribute of each of the plurality of pixels in image data of a color space (correlating to at least perceptual image characteristics) received at 752. Then, data may be forward to statistical analysis module 756 that may be configured to determine statistics, such as histograms, for the plurality of pixels using the at least one color attribute. Document recognition module 758 may be a categorization module that is configured to analyze the statistics received from statistical analysis module 756 and classify the image data into a category. At least the category information for the image data received at 752 is output at 760 and used to determine a billing structure.

The examination element 718 may operatively communicate with a billing calculation element 720. The billing calculation element 720 is configured analyze results of the examination element 718 (e.g., category and statistical information, including color space component data), and determine a billing structure for the image data. In some embodiments, the billing calculation element 720 is configured to calculate what to charge or bill a user based on an expected value of the image to the user (perceived value of the perceptual image). This could be a simple equation or an ad-hoc set of rules.

In a possible embodiment, examination element 718 and billing calculation element 720 are part of a billing system to be implemented by an operative set of processor executable instructions configured for execution by at least one processor or processing element. The billing system may be provided at a remote location with respect to the at least one processor. In an embodiment, the at least one processor is provided in an image processing apparatus, which may comprise an input device for inputting image data and an output device for outputting image data. In an embodiment, the at least one processor of the billing system is provided at a remote location with respect to an output device. As noted above, at least one processing element of system 703 may implement the operative set of processor executable instructions of the billing system by communicating via the network 722, for example. The at least one processing element may thus be provided in the same or a remote location with respect to the output device. In some cases, the examination element 718 and/or billing calculation element 720 may communicate an approximate cost or billing cost to the processor/system 703. In some cases, the examination element 718 and/or billing calculation element 720 may be a part of the processor which communicates with system 703 or an output device.

In a possible embodiment, the billing structure calculated by the billing calculation element 720 (or its associated processing element) may be sent directly to the output device 714. For example, as shown in FIG. 7, the billing calculation element 720 may communicate via path 707 the approximate billing structure to the output device 714. In one embodiment, charges to a user (for outputting the output document) may be determined in the output device 714.

Also, it is envisioned that an embodiment in accordance with this disclosure may include a system that utilizes a network connection 722 for proposed billing estimates. For example, a user may submit a proposed job (e.g., document) to a website such that a cost estimate for outputting (e.g., printing) the job may be provided to the user via such website. A system and/or website may utilize a method such as method 100 to estimate such costs, for example. The system may comprise similar elements noted with respect to the image path of the system 700 in FIG. 7, including, but not limited to, a communication device (such as a network), examination element, billing calculation element, processor and processing elements, for example. The system may include a personal computer (PC) or display device for displaying an estimated cost being communicated via a connected network. The network may include any type of network such as the Internet, Wi-Fi, DSL, local area network (LAN), or wide area network (WAN), for example.

With the herein disclosed methods, existing image paths may be easily altered. For example, examination, analyzation, and/or billing calculation modules may already exist in the image path.

Other embodiments include incorporating the above methods into a set of computer executable instructions readable by a computer and stored on a data carrier or otherwise a computer readable medium, such that the method 100 (in FIG. 1) is automated. In a possible embodiment, the methods may be incorporated into an operative set of processor executable instructions configured for execution by at least one processor. FIGS. 2-6 show flow charts of such computer readable instructions that may be implemented by one or more processing elements/processors. For example, in some embodiments, memory or storage of an output device carrying instructions is configured such that when the executable instructions are executed by a computer or processor, they cause a computer or processor to automatically perform a method 100 for determining a billing structure for outputting documents. Such instructions may be contained in memory, for example. In alternative embodiments, hard-wired circuitry may be used in place of or in combination with software instructions to implement the disclosure. Thus, embodiments of this disclosure are not limited to any specific combination of hardware circuitry and software. Any type of computer program product or medium may be used for providing instructions, storing data, message packets, or other machine readable information associated with the method 100. The computer readable medium, for example, may include non-volatile memory, such as a floppy, ROM, flash memory, disk memory, CD-ROM, and other permanent storage devices useful, for example, for transporting information, such as data and computer instructions. In any case, the medium or product should not be limiting.

While the principles of the disclosure have been made clear in the illustrative embodiments set forth above, it will be apparent to those skilled in the art that various modifications may be made to the structure, arrangement, proportion, elements, materials, and components used in the practice of the disclosure. For example, the system 703 may be a computer system which includes a bus or other communication mechanism for communicating information, and one or more of its processing elements may be coupled with the bus for processing information. Also, the memory 706 may comprise random access memory (RAM) or other dynamic storage devices and may also be coupled to the bus as storage for the executable instructions. Storage device 708 may include read only memory (ROM) or other static storage device coupled to the bus to store executable instructions for the processor or computer. Alternatively, another storage device, such as a magnetic disk or optical disk, may also be coupled to the bus for storing information and instructions. Such devices are not meant to be limiting.

It has herein been described that a billing structure is determined based on at least the category that the received image data is classified in. In an embodiment, billing can be driven by not only the category of visual color content of the document, but also consider any volumes of marking material (e.g., ink) used for rendering. Such volumes may be determined using any number of methods and are not described in detail herein.

Although this disclosure has described examples using hue, chroma, and value as example color attributes that are statistically analysis and for categorizing image data, any standard or specially constructed component or components that correlate to quantities that are desired to drive billing can be used to ensure that behavior of the billing system makes intuitive sense and meets the needs of all parties (user and customer).

Additionally, this disclosure is capable of applying similar techniques to image data of any type of document or output communication (not just copied/printed on a physical page or document) where it may be desirable to categorize content (of any kind) based on use of color. For example, some non-limiting examples of output may be: letters, books, slides, photographs, advertisements, posters, labels, keypads, signs, movies, items communication through projection, direct viewing monitors, epaper documents (e.g. displayed on an electronic or digital communication device), transparent displays (e.g., in cars), glasses, immersive systems using closed glasses with displays inside, etc. Accordingly, it should be understood that this disclosure may be used to process images that are perceived by a person.

Moreover, in an embodiment, it is envisioned that this disclosure and its methods may be extended to images that are perceived by a machine. For example, machines may detect or perceive use of color on forms that is both visible to the human eye and not visible (substantially invisible or colorless) to the human eye. Substantially invisible color may be detected using a device configured to detect or discern pixels or locations to be marked with a substantially colorless or clear marking material or medium, for example. The material may be illuminated (e.g., to become visible) by visible or non-visible light from a light source or camera, for example. Substantially invisible color may be determined and analyzed, and/or used for billing calculations when outputting image data.

As such, methods and systems that are designed to classify content of an image based on spectral content of the image—regardless of its source and regardless of the technology used to generate the image—are considered within the scope of this disclosure. Billing for such images is at least based on their categorical classification, but may also include other data, including, but not limited to, amounts of marking material used to output the image.

While this disclosure has been described in connection with what is presently considered to be the most practical and preferred embodiments, it is to be understood that it is capable of further modifications and is not to be limited to the disclosed embodiments, and this disclosure is intended to cover any variations, uses, equivalent arrangements or adaptations of the inventive concepts following, in general, the principles of the disclosed embodiments and including such departures from the present disclosure as come within known or customary practice in the art to which the embodiments pertains, and as may be applied to the essential features hereinbefore set forth and followed in the spirit and scope of the appended claims.

It will be appreciated that various of the above-disclosed and other features and functions, or alternatives thereof, may be desirably combined into many other different systems/devices or applications. Various presently unforeseen or unanticipated alternatives, modifications, variations, or improvements therein may be subsequently made by those skilled in the art which are also intended to be encompassed by the following claims.

What is claimed is:

1. A processor-implemented method for processing image data using an image processing apparatus, the image processing apparatus comprising at least one processor for processing image data comprising a plurality of pixels, the method comprising the following acts implemented by the at least one processor:
   receiving, via the at least one processor, image data defined by input provided by a user of the image processing apparatus comprising a plurality of pixels of a color space;
   determining via the at least one processor at least a chroma value and a hue value of each of the plurality of pixels in the received image data correlating to at least perceptual image characteristics;
   determining statistics, by the at least one processor, for the plurality of pixels using the at least determined chroma and hue values;
   analyzing the determined statistics, by the at least one processor, and classifying the image data into a color category from among a plurality of color categories, each color category of the plurality of color categories having boundaries defined by a predetermined range of chroma and hue values; and
   determining a billing structure, by the at least one processor, for the image data based on at least the color category into which the image data was classified.

2. The method according to claim 1, wherein the determining statistics for the plurality of pixels comprises:
   generating one or more histograms of pixel values using the at least determined chroma and hue values.

3. The method according to claim 1, wherein the color category for classifying the image data is selected from the group consisting of: monotone, contone, highlight color, bi-level color, discrete color, subdued color, low color, and full color.

4. The method according to claim 1, wherein the analyzing the determined statistics further comprises filtering the image data using at least one filter configured to manipulate the image data so as to produce image data approximating perception by the human eye.

5. The method according to claim 1, wherein the boundaries of each color category of the plurality of color categories are based on color as perceived by the human eye.

6. A system for processing image data comprising:
   an input device for receiving image data, and
   at least one processor for processing the pixels of the image data,
   wherein the at least one processor is configured to: receive image data defined by input provided by a user of the system comprising a plurality of pixels of a color space; determine at least a chroma value and a hue value of each of the plurality of pixels in the received image data correlating to at least perceptual image characteristics; determine statistics for the plurality of pixels using the at least determined chroma and hue values; analyze the determined statistics to classify the image data into a color category, each color category having boundaries defined by a predetermined range of chroma and hue values, and determine a billing structure for the image data based on at least the category.

7. The system according to claim 6, wherein determining statistics for the plurality of pixels further comprises the at least one processor being configured to:
   generate one or more histograms of pixel values using the at least determined chroma and hue values.

8. The system according to claim 6, further comprising an output device for outputting image data.

9. The system according to claim 8, wherein the output device is selected from the group consisting of: a printing device, a copying device, a facsimile machine, or a multi-function device.

10. The system according to claim 6, wherein the input device is selected from the group consisting of: an image input terminal, a scanner, a memory device, and a storage device.

11. The system according to claim 6, wherein the color category for classifying the image data is selected from the group consisting of: monotone, contone, highlight color, bi-level color, discrete color, subdued color, low color, and full color.

12. The system according to claim 6, wherein analyzing the determined statistics comprises the at least one processor being further configured to filter the image data using at least one filter configured to manipulate the image data so as to produce image data approximating perception by the human eye.

13. The system according to claim 6, wherein the boundaries of each color category of the plurality of color categories are based on color as perceived by the human eye.

14. A non-transitory computer readable medium having stored computer executable instructions, wherein the computer executable instructions, when executed by a computer, direct a computer to perform a method for processing image data, the method comprising:
   receiving image data defined by input provided by a user of the computer comprising a plurality of pixels of a color space;
   determining at least a chroma value and a hue value of each of the plurality of pixels in the received image data correlating to at least perceptual image characteristics;
   determining statistics for the plurality of pixels using the at least determined chroma and hue values;
   analyzing the determined statistics to classify the image data into a color category, each color category having boundaries defined by a predetermined range of chroma and hue values, and
   determining a billing structure for the image data based on at least the category.

15. The medium according to claim 14, wherein the determining statistics for the plurality of pixels comprises:
   generating one or more histograms of pixel values using the at least determined chroma and hue values.

16. The medium according to claim 14, wherein the color category for classifying the image data is selected from the group consisting of: monotone, contone, highlight color, bi-level color, discrete color, subdued color, low color, and full color.

17. The medium according to claim 14, wherein the analyzing the determined statistics further comprises filtering the image data using at least one filter configured to manipulate the image data so as to produce image data approximating perception by the human eye.

18. The medium according to claim 14, wherein the boundaries of each color category of the plurality of color categories are based on color as perceived by the human eye.

* * * * *